US008949058B2

(12) United States Patent
Schneider et al.

(10) Patent No.: US 8,949,058 B2
(45) Date of Patent: Feb. 3, 2015

(54) SYSTEM FOR DETERMINING THE LOAD MASS OF A LOAD CARRIED BY A HOIST CABLE OF A CRANE

(75) Inventors: Klaus Schneider, Hergatz (DE); Martin Amann, Frastanz (AT); Mathias Schneller, Bludenz (AT); Oliver Sawodny, Stuttgart (DE); Sebastian Kuechler, Boeblingen (DE)

(73) Assignee: Liebherr-Werk Nenzing GmbH, Nenzing (AT)

( * ) Notice: Subject to any disclaimer, the term of this patent is extended or adjusted under 35 U.S.C. 154(b) by 566 days.

(21) Appl. No.: 12/882,960

(22) Filed: Sep. 15, 2010

(65) Prior Publication Data

US 2011/0066394 A1 Mar. 17, 2011

(30) Foreign Application Priority Data

Sep. 16, 2009 (DE) ........................ 10 2009 041 662

(51) Int. Cl.
*G06F 19/00* (2011.01)
*B66C 13/16* (2006.01)

(52) U.S. Cl.
CPC ..................................... *B66C 13/16* (2013.01)
USPC .......................................................... 702/101

(58) Field of Classification Search
USPC .......................................................... 702/101
See application file for complete search history.

(56) References Cited

U.S. PATENT DOCUMENTS

| | | | |
|---|---|---|---|
| 4,677,579 | A | 6/1987 | Radomilovich |
| 2002/0144968 | A1 | 10/2002 | Ruddy |

FOREIGN PATENT DOCUMENTS

| | | | |
|---|---|---|---|
| DE | 222577 A1 | 5/1985 | |
| DE | 19512103 A1 | 10/1996 | |
| EP | 1602617 A1 | 12/2005 | |

OTHER PUBLICATIONS

Hanafy M. Omar, Control of Gantry and Tower Cranes, Jan. 2003 Blacksburg, Virginia, 1-100 pages.*
Ignacio Garcia-Fernandez , Elevation Cable Modeling for Interactive Simulation of Cranes, Eurographics/ ACM SIGGRAPH Symposium on Computer Animation (2008), 9 pages.*
B.H. Emory, Modal Testing and Modeling of a Simplified Elevator System, Feb. 9-12, 2009 Orlando, Florida USA, 27 pages.*
Jørgen Sverdrup-Thygeson, Modeling and Simulation of an Active Hydraulic Heave Compensation System for Offshore Cranes, Jun. 2007, Master of Science in Engineering Cybernetics, Norwegian University of Science and Technology Department of Engineering Cybernetics, 72 pages.*

* cited by examiner

*Primary Examiner* — Tung S Lau
(74) *Attorney, Agent, or Firm* — Alleman Hall McCoy Russell & Tuttle LLP

(57) ABSTRACT

The present disclosure relates to a system for determining the load mass of a load carried by a hoist cable of a crane, said system comprising a measurement arrangement for measuring the cable load in the hoist cable and a calculation unit for determining the load mass on the basis of the cable force, wherein the calculation unit has a compensation unit which describes and at least partly compensates the effect of the indirect determining of the load mass via the cable force in a model.

16 Claims, 9 Drawing Sheets

SYSTEM FOR DETERMINING THE LOAD MASS OF A LOAD CARRIED BY A HOIST CABLE OF A CRANE

CROSS REFERENCE TO RELATED APPLICATION

This application claims priority to German Patent Application No. 10 2009 041 662.5, entitled "System for Determining the Load Mass of a Load Carried by a Hoist Cable of a Crane", filed Sep. 16, 2009, which is hereby incorporated by reference in its entirety for all purposes.

FIELD

The present disclosure comprises a system for determining the load mass of a load carried by a hoist cable of a crane, having a measurement arrangement for measuring the cable force and having a calculation unit for determining the load mass on the basis of the cable force.

BACKGROUND AND SUMMARY

The exact determination of the load mass of a load raised by a crane is of great importance for a plurality of applications: e.g. the load mass is important for the load moment limitation system of the crane, that is, for the tilt protection and for the structural protection. In addition, the load mass is of great importance for the data acquisition with respect to the performance of the crane. The total payload to be transferred can in particular be determined by an exact determination of the load mass. The load mass is furthermore also of great importance as a parameter for other control tasks at the crane such as a load swing damping.

A common method for determining the load mass is the measurement of the cable force in the hoist cable. The cable force in the hoist cable in this respect substantially corresponds to the load mass at least in a static state.

The measurement arrangement for measuring the cable force can in this respect be positioned either directly at the load suspension means. This positioning at the load suspension means has the advantage that only a few disturbing influences are present here and a greater precision can thus be achieved. The disadvantage of this solution is, however, that a power supply and a corresponding signal line to the load suspension means are necessary.

A further possibility is the positioning of a measurement arrangement in a connection region between the crane structure and the hoist cable, for example at a deflection pulley or at the hoisting gear. This has the advantage that the measurement arrangement can be made very robust and the cabling is relatively simple. It is disadvantageous in this arrangement of the measurement arrangement that further disturbing influences make an exact determination of the load mass from the cable force more difficult, particularly during dynamic conditions.

In this respect, it is already known to use mean (averaging) filters for determining the cable force. On the one hand, this has the disadvantage, however, that a relatively high delay in the signal output has to be accepted. On the other hand, a plurality of disturbing influences cannot be eliminated via a mean filter.

It is therefore the object of the present disclosure to provide a system for determining the load mass of a load carried by the hoist cable which allows an improved determination of the load mass based on the cable force.

This object is achieved in accordance with the present disclosure by a system for determining the load mass of a load carried by a hoist cable of a crane comprising a measurement arrangement positioned for measuring the cable force in the hoist cable and a calculation unit for determining the load mass on the basis of the cable force. In accordance with the present disclosure, the calculation unit has a compensation unit which describes the influence of the indirect determination of the load mass via the cable force in a model and at least partly compensates it when determining the load mass.

Provision can be made, on the one hand, in this respect that the compensation unit at least partly compensates static influences of the indirect determination of the load mass via the cable force. For this purpose, in accordance with the present disclosure, the static influences of the indirect determination are modeled and compensated by the compensation unit. A substantially more precise determination of the load mass hereby results which was not possible at all via mean value filters since they cannot eliminate static influences at all.

Provision can alternatively or additionally be made that the compensation unit also at least partly compensates dynamic influences of the indirect determination of the load mass via the cable force. Provision is also made for this purpose that the compensation unit models the dynamic influences and compensates the load mass in the determination.

Provision is advantageously made in accordance with the present disclosure that the compensation unit is based on a physical model of the lifting procedure which models the static and/or dynamic influences of the indirect determination of the load mass via the cable force. The compensation unit can at least partly compensate these static and/or dynamic influences by this model.

Provision is advantageously made in this respect that the compensation unit works on the basis of data on the position and/or movement of the crane.

In this respect, data on the position and/or movement of the hoisting gear and/or data on the position and/or movement of the boom and/or of the tower are advantageously included in the compensation unit, The system in accordance with the present disclosure is in particular used in this respect in derrick boom cranes in which a boom can be luffed up and down about a horizontal luffing axis and can be rotated via a tower or superstructure about a vertical axis of rotation.

Provision is advantageously made in this respect that the measurement arrangement is arranged in a connection element between an element of the crane structure and the hoist cable, in particular at a deflection pulley or at the hosting gear. Provision is advantageously made in this respect that the compensation unit at least partly compensates static and/or dynamic influences of the arrangement of the measurement arrangement. The compensation unit in this respect advantageously compensates the influences of the arrangement of the measurement arrangement on the cable force.

Provision is advantageously made in this respect that the compensation unit includes a cable mass compensation which takes account of the hoist cable's net weight. The hoist cable has a net weight which is not to be neglected and which no longer falsifies the determination of the load mass due to the present disclosure. The compensation unit in this respect advantageously takes account of the influence of the change in the cable length on the raising and/or lowering of the load in the calculation of the load mass. The net weight of the hoist cable has a different influence on the cable force in dependence on the lifting phase due to the change in the cable length. The system in accordance with the present disclosure takes this into account.

The system is in this respect advantageously used in a hoisting gear which includes a winch, with the angle of rotation and/or the speed of rotation of the winch being included in the cable mass compensation as an input value. The cable length and/or the cable speed can be determined on the basis of the angle of rotation and/or on the speed of rotation and its/their influence on the cable force can be taken into account in the calculation of the load mass.

Alternatively, the cable length and/or the cable speed can also be determined via a measurement roll. It can e.g. be arranged separately at the cable or can be made as a deflection pulley.

Provision is further advantageously made that the cable mass compensation takes account of the net weight of the hoist cable wound up on the winch. This is in particular of advantage when the measurement arrangement is arranged at the hoist winch for the measurement of the cable force, in particular at a torque support of the hoist winch since then the cable wound up on the winch is supported on the measurement arrangement and thus influences the measured values.

Provision is further advantageously made that the cable mass compensation takes account of a length of hoist cable sections changing by the movement of the crane structure and/or takes account of the alignment of hoist cable sections. This is in particular of importance in such cranes in which the hoist cable system changes its length or alignment on a movement of the crane structure, in particular on a movement of the boom. This is in particular the case when the cable is not guided parallel to the boom at the crane, but rather when the cable adopts an angle to the boom which changes by a luffing up and down of the boom. Depending on the position of the crane structure, in particular of the boom, different lengths and/or alignments of the sections of the hoist cable thus result, which in turn influence the effect of the net weight of the hoist cable on the output signal of the measurement arrangement.

Provision is further advantageously made that the compensation unit includes a deflection pulley compensation which takes account of friction effects due to the deflection of the hoist cable about one or more deflection pulleys. In this respect, in particular the bending work required for the deflection of the hoist cable is advantageously taken into account as a friction effect. Alternatively or additionally, the roll friction in the deflection pulleys can also be taken into account.

Provision is advantageously made in this respect that the deflection pulley compensation takes account of the direction of rotation and/or of the speed of rotation of the deflection pulleys. In particular the direction of rotation in this respect has a not insubstantial influence on the cable force.

The deflection pulley compensation in this respect advantageously calculates the direction of rotation and/or the speed of rotation of the deflection pulleys caused by the movement of the crane structure and the movement of the hoisting gear. In particular with multiaxial deflection pulleys of the hoist cable between the tower and the boom, complicated movement patterns can result here which have a corresponding effect on the output signal of the measurement arrangement.

The deflection pulley compensation in this respect advantageously determines the friction effects in dependence on the measured cable force. The cable force has a decisive influence on the friction effects. In this respect, the friction effects are advantageously determined on the basis of a linear function of the measured cable force since a linear function represents a relatively good approximation of the physical situation.

Further advantageously, provision is made in the system in accordance with the present disclosure that the compensation unit takes account of the influence of the acceleration of the load mass and/or of the hoisting gear on the cable force in the determination of the load mass. The acceleration of the load mass and/or of the hoisting gear in this respect generates a dynamic component of the hoist force which is at least partly compensated by the compensation in accordance with the present disclosure. The compensation unit in this respect advantageously works on the basis of a physical model which describes the influence of the acceleration of the load mass and/or of the hoisting gear on the cable force.

Provision is further advantageously made that the calculation unit takes account of the oscillation dynamics, which arise due to the elasticity of the hoist cable, in the determination of the load mass. In addition to the accelerations which are caused by the accelerations induced via the hoisting gear, the system of cable and load additionally has oscillation dynamics which arise due to the elasticity of the hoist cable. The compensation unit advantageously at least partly compensates these oscillation dynamics. The compensation unit for the compensation of the oscillation dynamics is in this respect advantageously based on a physical model.

The calculation unit of the system in accordance with the present disclosure in this respect advantageously includes a load mass observer which is based on a spring mass model of the cable and of the load. The mass of the actual load as well as the mass of the load suspension means and of the slings are in this respect advantageously described in the model. In contrast, the cable between the winch and the load suspension means is included as a spring in the model.

The load mass observer in this respect advantageously constantly compares the measured cable force with the cable force predicted with reference to the spring-mass model on the basis of the previously measured cable force. On the basis of this comparison, the load mass observer estimates the load mass of the load which is included as a parameter in the spring-mass model of the cable and of the load. The load mass can hereby be determined with high precision and with compensation of dynamic influences.

The load mass observer in this respect advantageously takes account of the measurement noise of the measured signals. A white noise free of mean values is advantageously used for this purpose.

Data on the length of the cable are advantageously included as measured signals in addition to the output signal of the measurement arrangement for determining the cable force. In this respect, a cable force normalized with respect to the permitted maximum load is advantageously used as a parameter of the load mass observer.

The present disclosure furthermore includes a crane having a system for the determination of the load mass of a load carried by a hoist cable, as was presented above. The crane is in this respect in particular a boom crane in which the boom can be luffed up and down about a horizontal luffing axis. Further advantageously, the crane can be rotated about a vertical axis of rotation. The boom is in this respect in particular pivotally connected to a tower which is rotatable about a vertical axis of rotation with respect to an undercarriage. The boom can in this respect in particular be a harbor mobile crane. The system in accordance with the present disclosure can, however, likewise be used in other crane types, e.g. in gantry cranes or tower slewing cranes.

In this respect, the system could advantageously be used in a crane in which the measurement arrangement for measuring the cable force is arranged in a connection element between an element of the crane structure and the hoist cable; in particular in a deflection pulley or at the hoisting gear. A very robust arrangement hereby results which nevertheless enables an exact determination of the load mass due to the system in accordance with the present disclosure.

In this respect, a plurality of applications are possible by the system in accordance with the present disclosure which were not able to be realized with known inaccurate systems. For example, a slack cable recognition can be installed which recognizes that the load was put down on the basis of the system in accordance with the present disclosure. An immediate switching off of the hoisting gear is thereupon initiated which prevents cable damage due to unwound cables. Mechanical slack cable switches can hereby optionally be dispensed with. In addition, a recognition of very small loads is now likewise possible such as of empty containers.

The system in accordance with the present disclosure furthermore has the great advantage over mean filters that the load mass can be determined without larger delay. A higher turnover hereby results since fewer stops occur when the load mass signal is used for the load moment limitation system. In addition, the service life of the crane is increased since the load moment limitation system can intervene without any greater time delay.

In addition to the system and to the crane, the present disclosure further comprises a method for determining the load mass of a load carried by the hoist cable, comprising the steps: measuring the cable force in the hoist cable; calculating the load mass on the basis of the cable force; wherein the influence of the determination of the load mass via the cable force is described in a model and is at least partly compensated.

The compensation in this respect in particular takes place on the basis of a model of the static and/or dynamic influences of this determination. These influences can hereby be calculated and can be at least partly compensated by the compensation unit.

The method in accordance with the present disclosure advantageously takes place as was represented above with respect to the system and to the crane. The method in accordance with the present disclosure in this respect in particular takes place by means of a system as was described above.

The present disclosure will now be explained in more detail with reference to embodiments and to drawings.

DETAILED DESCRIPTION

Figure 1:
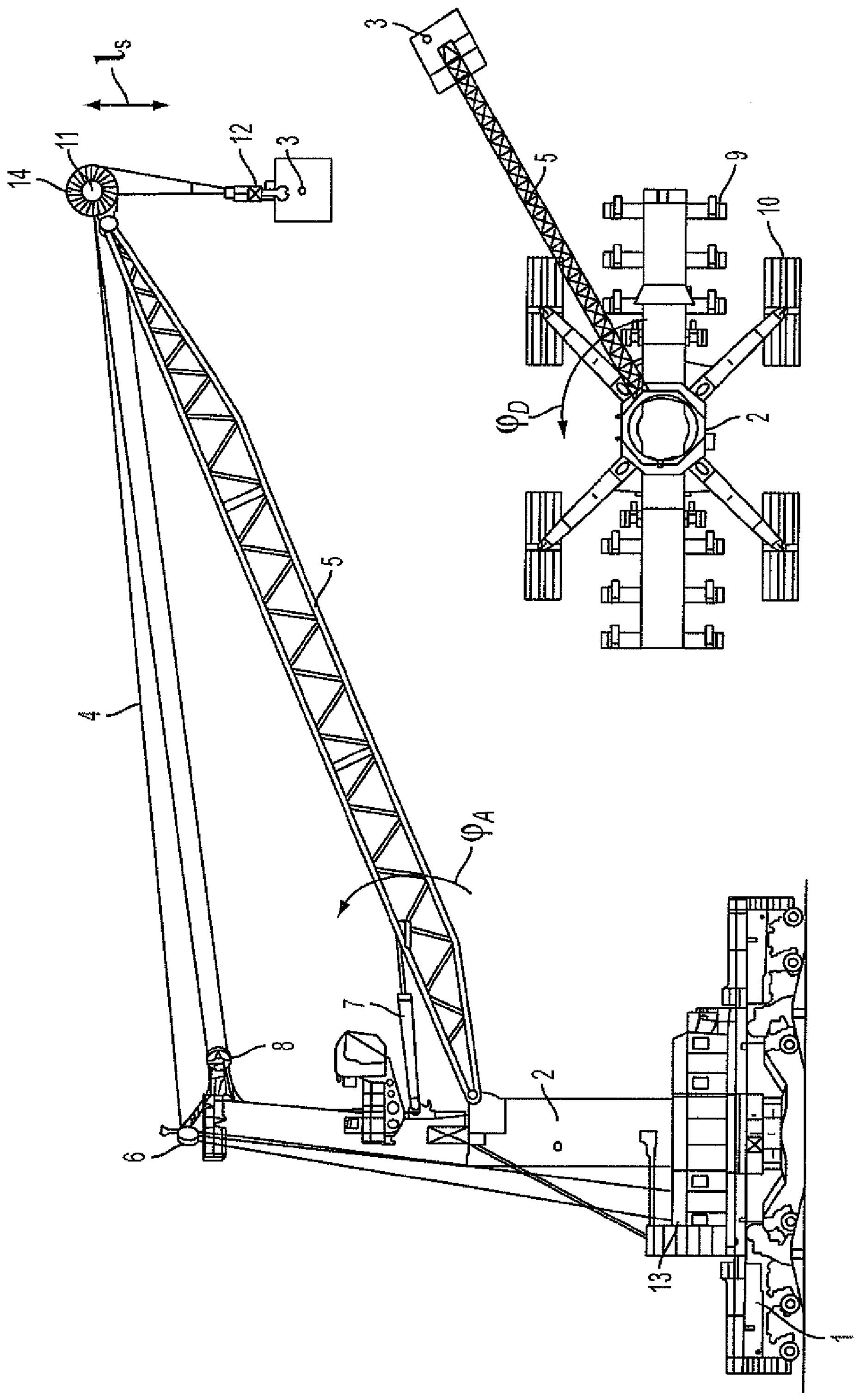
FIG. 1 shows an embodiment of a crane in accordance with the present disclosure.

FIG. 1 shows an embodiment of a crane in accordance with the present disclosure in which an embodiment of a system in accordance with the present disclosure for determining the load mass of the load suspended at the crane cable is used. The crane in the embodiment is a harbor mobile crane. In this respect, the crane has an undercarriage 1 with a chassis 9. The crane can hereby be moved in the harbor. At the lifting location, the crane can then be supported via support units 10.

A tower 2 is arranged rotatably about a vertical axis of rotation on the undercarriage 1. A boom 5 is connected pivotally about a horizontal axis to the tower 2. The boom 5 can in this respect be pivoted upwardly and downwardly in the luffing plane via the hydraulic cylinder 7.

The crane in this respect has a hoist cable 4 which is led about a deflection pulley 11 at the tip of the boom. A load suspension means 12 (such as a load coupling element including a hook, spreader, or other such device to couple the load to the cable 4) with which a load 3 can be taken up is arranged at the end of the hoist cable 4. The load suspension means 12 or the load 3 are in this respect raised or lowered by moving the hoist cable 4. The change in the position of the load suspension means 12 or of the load 3 in the vertical direction thus takes place by decreasing or increasing the length lS of the hoist cable 4. A winch 13 which moves the hoist cable is provided for this purpose. The winch 13 is in this respect arranged at the superstructure. The hoist cable 4 is furthermore first led from the winch 13 via a first deflection pulley 6 at the tip of the tower 2 to a deflection pulley 14 at the tip of the boom 5 and from there back to the tower 2 where it is led via a second deflection pulley 8 to a deflection pulley 11 at the boom tip from where the hoist cable runs down to the load 3.

The load suspension means 12 or the load can furthermore be moved in the horizontal by rotating the tower 2 about the angle $\phi D$ and by luffing the boom 5 up and down by the angle $\phi A$. A lifting movement of the load 3 in addition to the movement of the load in the radial direction results on the luffing of the boom 5 up and down by the arrangement of the winch 13 at the superstructure. This must optionally be compensated by a corresponding control of the winch 13.

Figure 2:
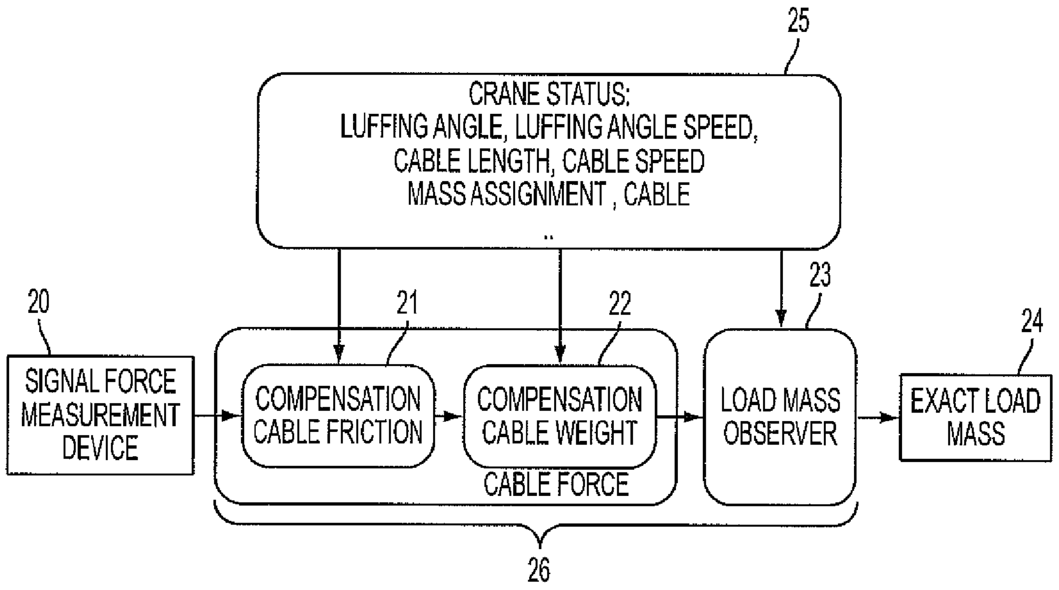
FIG. 2 shows a schematic representation of an embodiment of a system and method in accordance with the present disclosure.

FIG. 2 shows an embodiment of a system in accordance with the present disclosure for determining the load mass of the load suspended at the hoist cable of a crane. In this respect, the signal 20 which is produced from a measurement arrangement for measuring the cable force in the hoist cable serves as the input value of the system. Said signal is supplied to the calculation unit 26 in accordance with the present disclosure for determining the load mass. The calculation unit 26 delivers the exact load mass as the output signal 24. The calculation unit has a compensation unit which at least partly compensates the influences of the determination of the load mass via the cable force. The compensation unit calculates the influences on the basis of data on the crane status which are transmitted from the crane status unit 25 to the calculation unit 26. In this respect, in particular the luffing angle or the luffing angle speed of the boom is utilized in the calculation unit. Furthermore, the cable length and/or the cable speed can be included in the calculation unit, with them in particular being determined via the position and/or speed of the hoist winch 13.

The compensation unit is in this respect based on a physical model of the hoist system by which the influences of the individual components of the hoist system on the cable force and on the load mass can be calculated. The compensation unit can hereby calculate and at least partly compensate these influences.

The compensation unit in this respect includes three components in the embodiment which could, however, also be used independently of one another. The compensation unit in this respect first includes a deflection pulley compensation 21 which compensates the friction of the cable at the deflection pulleys. The compensation unit further includes a cable mass compensation which compensates the influence of the cable weight on the cable force and thus on the load mass. The compensation unit further includes a load mass observer 23 which takes account of dynamic interference to the signal due to the acceleration of the load or of the hoisting gear, and in particular those which arise due to the inherent dynamics of the system of hoist cable and load.

Figure 3A:
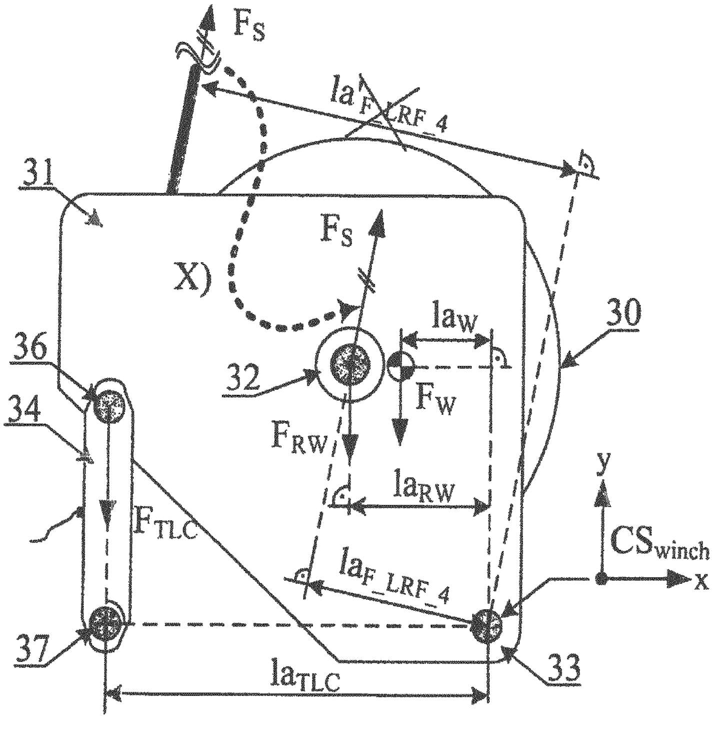
FIGS. 3*a* and 3*b* show the arrangement of a measurement arrangement at the hoist winch.
Figure 3B:
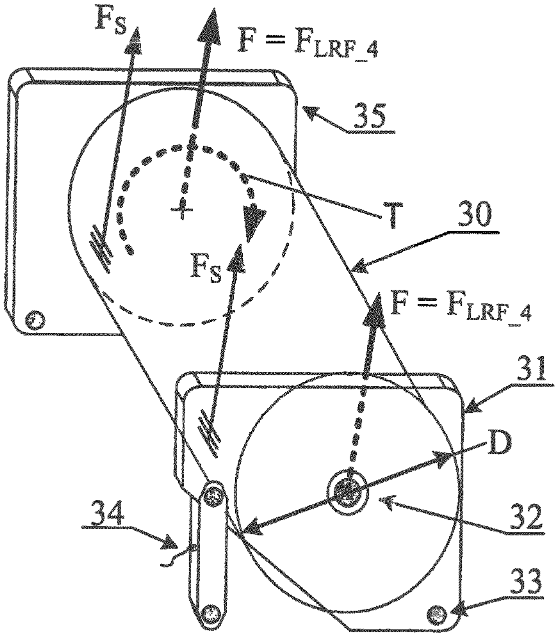

The individual components of the system in accordance with the present disclosure will now be represented in detail:

The hoist winch of the crane in accordance with the present disclosure is shown in FIGS. 3*a* and 3*b*, with a measurement arrangement 34 for measuring the cable force being arranged at said hoist winch. As illustrated, the measurement arrangement is located upstream from the load coupling element, where upstream is defined as in a direction opposite the load from the load coupling element. The hoist winch 30 is in this respect rotatably pivoted about an axis of rotation 32 at two frame elements 31 and 35. The force measurement arrangement 34 is arranged as a torque support at the frame element 31. The frame element 31 is in this respect pivotally connected to the crane about the axis 33. The frame element 31 is pivotally connected to the crane via the force measurement arrangement 34 at the oppositely disposed side. In this respect, the force measurement arrangement 34 is made in bar form and is bolted to the frame element 31 via a bolt arrangement 36 and to the crane via a bolt arrangement 37. In this respect, a tension load cell (TLC) can be used as the force measurement arrangement 34. Alternatively, a load bolt or a load cell can e.g. also be used as a force measurement arrangement.

The cable force FS initially acts on the winch due to the arrangement of the force measurement arrangement 34 between the crane structure and the winch and via the winch frame on the force measurement arrangement in which a force FTLC is caused by the cable force FS.

To calculate the cable force FS from the force FTLC measured by the force measurement arrangement 34, the geometry of the arrangement of the force measurement arrangement 34 at the winch must be taken into account. In this respect, the mass of the winch itself must also be taken into account which is supported on the force measurement arrangement 34 and thus acts against the cable force.

In addition, it must optionally be taken into account that the force measurement arrangement 34, as shown in FIG. 3*b*, is only arranged at one of the two frame elements 31 and 35. The frame element 35 is in this respect fixedly bolted to the crane structure. The drive for the hoist winch is arranged at this frame element 35.

Figure 4:
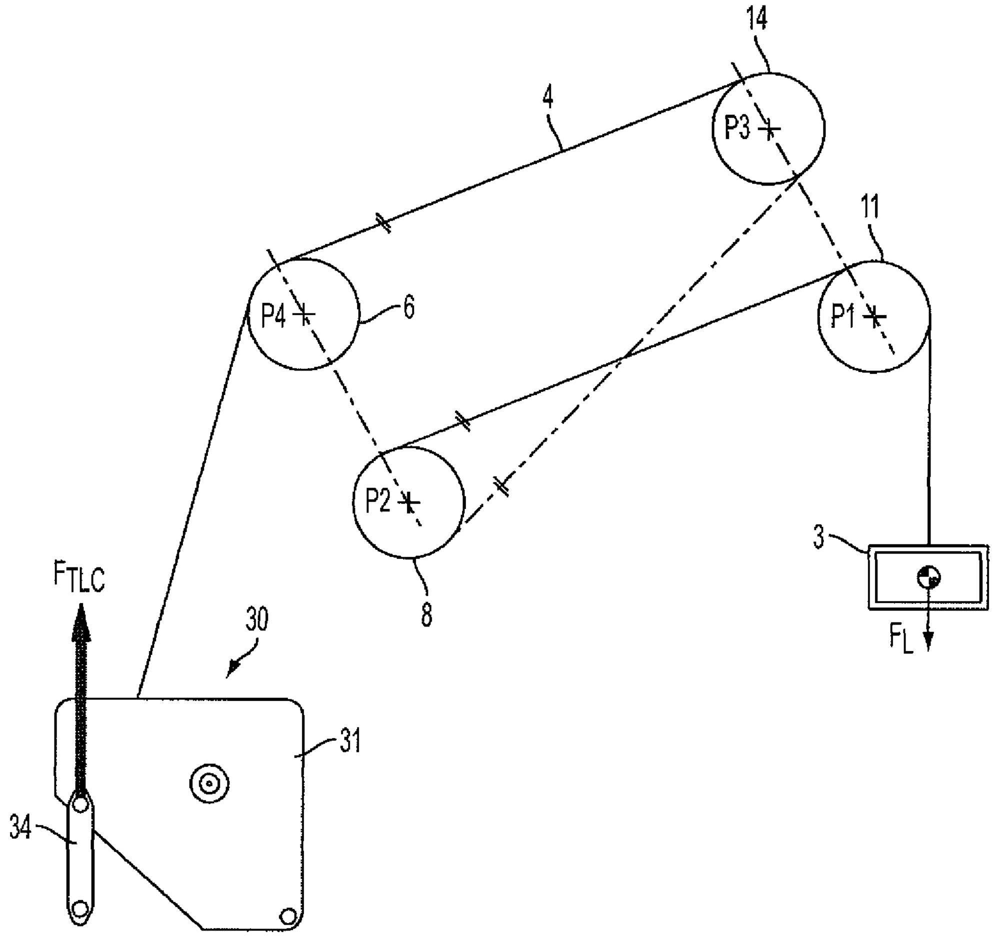
FIG. 4 shows the arrangement of a measurement arrangement at the hoist winch and the cable guidance of the hoist cable via deflection pulleys.

The principle of the measurement of the load mass with reference to the cable force or with reference to the force which is measured by the measurement arrangement 34 as well as the forces occurring in this process are all shown again in this respect in FIG. 4.

The hoist cable 4 in this respect runs from the winch 30 via deflection pulleys 6, 14 and 8 to the deflection pulley 11 at the tip of the boom, from where the hoist cable 4 is led to the load 3. The mass of the load 3 in this respect generates a force in the hoist cable 4 which the hoist cable introduces into the winch 30. The winch 30 is in this respect pivotally connected to a winch frame and applies a corresponding force thereto. A force FTLC is hereby introduced into the force measurement arrangement 34 which connects the frame element 31 of the winch frame to the crane structure. Due to the geometrical relationships between the hoist cable, the hoist winch, the winch frame and the force measurement arrangement, it is possible to draw a conclusion on the mass of the load from the force measured by the force measurement arrangement 34.

However, due to the arrangement of the measurement arrangement in a connection element between the crane structure and the hoist cable, a series of influences result which would lead to substantial inaccuracies in the determination of the load mass without compensation. The calculation unit in accordance with the present disclosure therefore has a corresponding compensation unit which compensates these influences.

Figure 5:
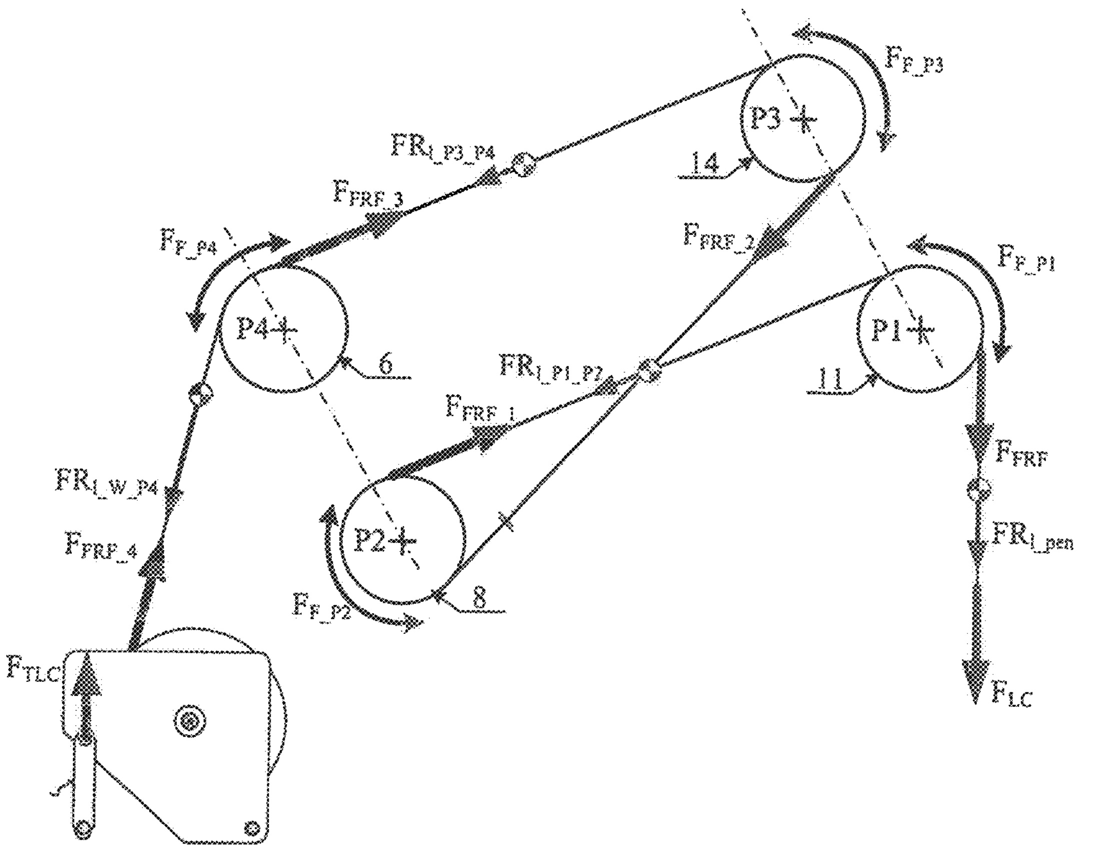
FIG. 5 shows a representation of the forces taken into account in the deflection pulley compensation.

In this respect, the deflection pulley compensation in accordance with the present disclosure will first be described in more detail with reference to FIG. 5 by which friction effects at the deflection pulleys are compensated. The hoist cable 4 is in this respect in each case deflected by a specific angle at the deflection pulleys 6, 14, 8 and 11. A series of friction influences hereby result on the cable force. In this respect, a friction force arises at each deflection pulley which increases or decreases the force measured by the measurement arrangement in dependence on the situation, in particular in dependence on the direction of rotation of the deflection pulley.

In this respect a roll friction which is determined in accordance with the Striebeck curve arises at the bearing of the deflection pulley. This roll friction is, however, relatively small and can therefore be neglected. The angular deflection of the hoist cable at the deflection pulleys has the much greater influence. In this respect, the hoist cable is subject to a deformation, both when running into and when running out of the deflection pulley, which requires a corresponding deformation work. The magnitude of this friction arising due to the deformation of the hoist cable at the deflection pulleys is in this respect substantially determined by the radius of the deflection pulleys and by the cable force.

In this respect, measurements have shown that the total friction at each deflection pulley substantially extends linear to the cable force. The angular speed of the deflection pulleys, in contrast, only has very little influence on the friction. It must, however, be noted in this respect that the friction at each deflection pulley either has to be added to the measured friction force or has to be subtracted from it depending on the direction of rotation of the deflection pulley. On the raising of the load, the friction force of the deflection pulleys in this respect acts against the lifting force produced by the hoist winch so that the measured cable force is increased by the friction forces. When the load is let down by the hoisting gear, the measured cable force is, in contrast, reduced by a corresponding amount.

In this respect, it must furthermore be taken into account that the hoist cable is guided to and fro between the tower tip and the boom tip, with the two deflection pulleys 6 and 8 being arranged at the tower tip and the two deflection pulleys 14 and 11 at the boom tip. A movement of the deflection pulleys 8, 11, and 14 therefore likewise also results on the luffing up and down of the boom, while the deflection pulley 6 is not moved without a movement of the hoisting mechanism. Accordingly, a friction force arises on the luffing up and down of the boom which substantially corresponds to ¾ of the friction force on the raising and lowering of the load via the hoisting mechanism.

The compensation unit in accordance with the present disclosure in this respect compensates the influences arising through the friction at the deflection pulleys. For this purpose, the compensation unit determines the respective direction of rotation of the deflection pulleys on the basis of the position and/or movement of the hoisting gear and of the boom. It must be taken into account in this respect that complex movement patterns of the deflection pulleys can very well occur on a combined movement of the hoisting gear and the boom so that not all deflection pulleys are introduced into the cable force with the same sign. The deflection pulley compensation therefore advantageously takes place on the basis of the winch speed and of the luffing speed of the boom.

Figure 6:
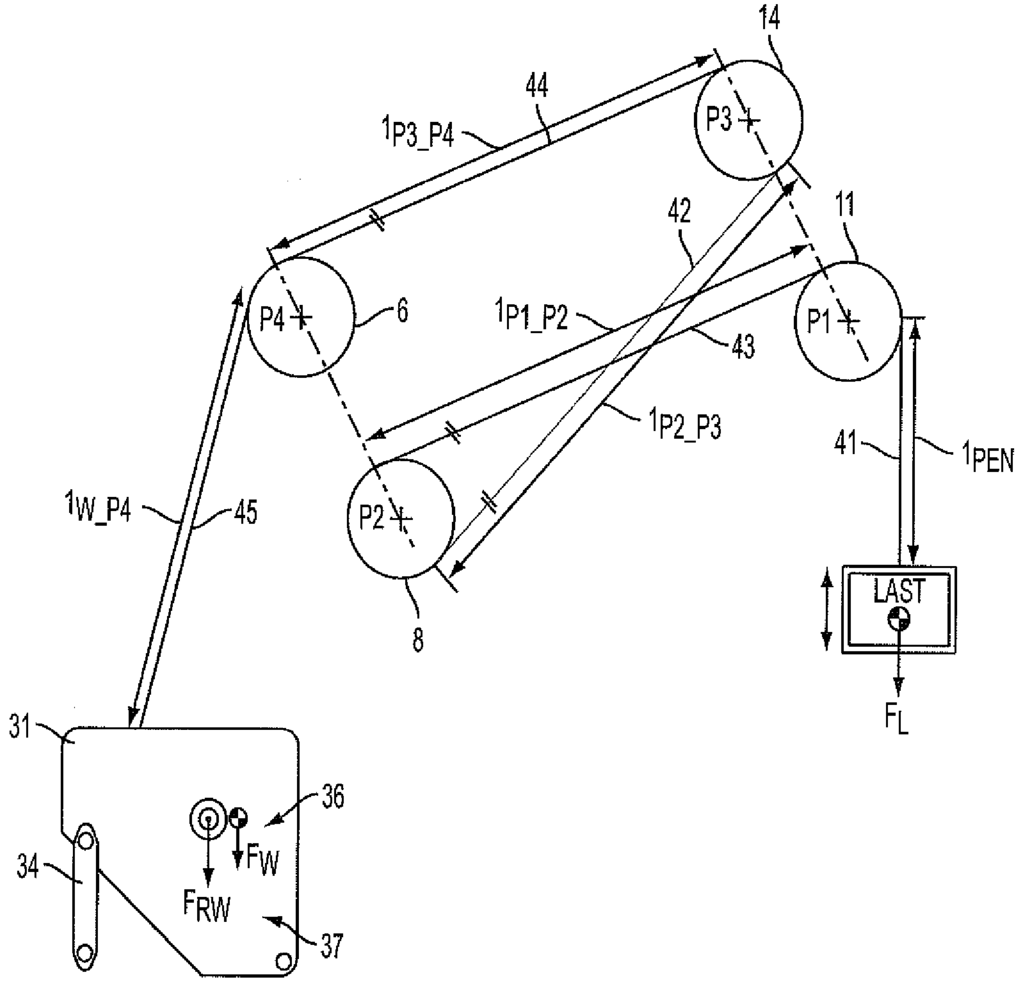
FIG. 6 shows a representation of the forces taken into account in the cable mass compensation.

The calculation unit in accordance with the present disclosure furthermore includes a cable mass compensation which will now be represented in more detail with reference to FIG. 6. As already described above, the weight FW 36 of the winch which is supported on the force measurement arrangement 34 must first be taken into account in the calculation of the cable force from the measured signal of the measurement arrangement 34. The hoist cable is, however, additionally at least partly wound on the winch. The mass of the hoist cable which is wound on the hoist winch is thus likewise supported on the force measurement arrangement 34. The weight force FRW 37 of the hoist cable wound on the winch must therefore also be taken into account. This weight force can be determined, for example, on the basis of the angle of rotation of the hoist winch.

The masses of the individual cable sections between the deflection pulleys furthermore also have an effect on the cable force and thus on the determination of the load mass. The cable sections 41 and 42 in this respect increase the measured cable force due to the mass of the cable, whereas the cable sections 43, 44 and 45 reduce the measured cable force. The length and the angle of the cable sections to the horizontal must each be considered in the calculation of this influence. It must be taken into account in this process that a constant length and a constant angle are only present for the cable section 45. The section 41, in contrast, is changed in length by raising and lowering the load. Sections 42-44 are in turn changed both in length and alignment by luffing up and down of the boom. The cable mass compensation therefore takes place on the basis of the position of the boom and of the hoist winch.

The deflection pulley compensation and the cable mass compensation thus substantially compensate the effect of the arrangement of the measurement arrangement at the hoist winch. Alternatively to the arrangement of the measurement arrangement at the hoist winch, it is also conceivable to integrate a measurement arrangement into one of the deflection pulleys, in particular into the deflection pulley 8 at the boom tip. In this arrangement of the measurement arrangement, the compensation in turn takes place in accordance with the principles shown above, but with the friction effects and the effects of the cable mass on the measured force having to be matched accordingly by the different arrangement of the measurement arrangement.

The system in accordance with the present disclosure takes account not only of the systematic influences which the arrangement of the measurement arrangement at a connection element between the crane structure and the hoist cable has on the determination of the load mass, but also compensates dynamic effects which are due to the acceleration of the load mass and/or the hoisting gear and to the elasticity of the hoist cable.

The system of hoist cable and load in this respect substantially forms a spring-mass pendulum which is excited by the hoisting gear due to the elasticity of the hoist cable. Oscillations hereby arise which are superimposed on the static portion of the cable force signal which corresponds to the load mass. In this process, the load mass observer is based on a physical model of the spring mass system of hoist cable and load. The model is in this respect shown schematically in FIG. 7. The load mass observer 23 estimates the exact load mass which goes into the physical model as a parameter by a comparison of the cable force which results from this model with the measured cable force.

An embodiment of the load mass observer in accordance with the present disclosure which is implemented as an extended Kalman filter (EKF) will now be represented in more detail in the following:

2 Modeling the Hoisting Gear Line

Figure 7:
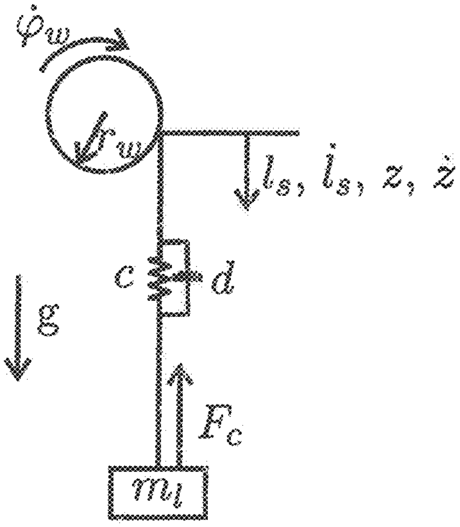
FIG. 7 shows a schematic diagram of the mass-spring model which is based on the cable mass observer in accordance with the present disclosure.

The dynamic model for the hoisting gear line will be derived in the following section. FIG. 1 shows the complete structure of a harbor mobile crane (LHM). The load with the mass ml is raised by the crane by means of the load suspension means and is connected to the hoist winch via the cable having the total length ls. The cable is deflected from the load suspension means via a respective one deflection pulley at the boom head and at the tower. It must be noted in this respect that the cable is not directly deflected to the hoist winch from the boom head, but that it is rather deflected from the boom head to the tower, back to the boom head and then via the tower to the hoist winch (see FIG. 1). The total cable length thus results as $$l_s(t)=l_1(t)+3l_2(t)+l_3(t), \tag{1}$$

where l1, l2 and l3 are the part lengths from the hoist winch to the tower, from the tower to the boom head and from the boom head to the load suspension means. The hoisting gear line comprising the hoist winch, the cable and the load mass is modeled in simplified form as the spring mass system in the following and is shown in FIG. 7.

According to Newton's Law of Motion, the movement equation for the spring mass damper system thus results as $$m_l\ddot{z}(t) = m_l g - \underbrace{(c(z(t) - l_s(t)) + d(\dot{z}(t) - \dot{l}_s(t)))}_{F_c} \tag{2}$$

with the acceleration due to gravity g, the spring constant c, the damper constant d, the load position z, the load speed ż and the load acceleration z̈. The cable speed $\dot{l}_s$ follows from the winch speed $^{\theta}$w and the winch radius rw as $$\dot{l}_s(t)=r_w\dot{\phi}_w(t). \tag{3}$$

The spring stiffness cs of a cable of a length ls can be calculated using Hooke's Law as $$c_s = \frac{E_s A_s}{l_s} \tag{4}$$

Here Es and As are the elasticity module and the cross-sectional area of the cable. Since parallel cables raise the load at the mobile harbor crane ns (cf. FIG. 1), the spring stiffness c of the hoisting gear line results as $$c=n_s c_s. \tag{5}$$

The damper constant d of the hoisting gear line is given by $$d=2D\sqrt{cm_l} \tag{6}$$

where D represents Lehr's damping factor of the cable.

Since the main object of the load mass observer is the estimating of the then current load mass, a dynamic equation has to be derived for the load mass. The load mass ml is modeled as a random walk process within this work, i.e. ml undergoes interference by an additive, mean-free white noise. The following dynamic equation thus results for the load mass $$\dot{m}_l=\gamma_l, \tag{7}$$

where γl represents a mean-free white noise.

3. Observer Design

An observer based on the EKF [3] is designed in this section. It must be noted here that the value ranges of the individual parameters differ greatly. The cable length ls and the load position z are thus usually between 100 m and 200 m, the cable speed $\dot{l}_s$ and the load speed ż between $$0\frac{m}{s} \text{ and } 2\frac{m}{s}$$

and the load mass between 0 kg and 150×103 kg. In addition, the two parameters Es and As also have very different value ranges. These different value ranges can lead to numerical problems in the online estimation of the observer. A new parameter for the observer design $$a_{hw} = \frac{E_s A_s n_s}{m_{max}} \tag{8}$$

is introduced to avoid these numerical problems, where mmax is the maximum permitted lifting load for the respective crane type. In addition, the load mass ml is not used directly in the observer, but rather the normed load mass $$\frac{m_l}{m_{max}}.$$

The winch position θw is measured at the crane via an incremental generator and the winch speed $\dot{\theta}$w is measured. A force measurement sensor provides the cable force Fw measured at the winch. The cable length and cable speed can be calculated from the winch position and winch speed by means of equation (3). It must be noted with respect to the measured cable force at the winch Fw that not only the force on the basis of the load mass is measured here, but also the friction effects of the deflection pulleys and the net weight of the cable. However, these interference influences can be eliminated by a compensation algorithm and the then current spring force Fc (cf. equation (2)) can be calculated from the measured cable force at the winch Fw.

The input parameters u and the output parameters (or measured parameters) y of the system must first be defined for an observer design. For the present problem, the cable speed $\dot{l}_s$ is selected as the only system input. The cable length ls and the normed spring force $$\frac{F_c}{m_{max}}$$

are selected as output parameters.

The dynamic model comprising equations (2), (4), (5), (6) and (8) can be transformed into the state space using the state vector $$\left[l_s,\ z,\ \dot{z},\ \frac{m_l}{m_{max}}\right]^T.$$

The resulting system of first order differential equations is $$\begin{aligned} \dot{x} &= f(x, u), \quad x(0) = x_0, \\ y &= h(x, u), \quad t \geq 0, \end{aligned} \tag{9}$$

-continued $$f(x) = \begin{bmatrix} u \\ x_3 \\ g - a_{hw}\dfrac{x_2 - x_1}{x_1 x_4} - 2D\sqrt{a_{hw}}\dfrac{x_3 - u}{\mathrm{sqrt}x_1 x_4} \\ 0 \end{bmatrix}, \tag{10}$$

$$h(x) = \begin{bmatrix} x_1 \\ a_{hw}\dfrac{x_2 - x_1}{x_1} + 2D\sqrt{a_{hw}}\dfrac{x_4}{x_1}(x_3 - u) \end{bmatrix}, \tag{11}$$

$$u = \dot{l}_s. \tag{12}$$

As already mentioned above, the observer is realized as an EKF. The EKF is an observer for non-linear, time-discrete systems and minimizes the error covariance of the error of estimation $\hat{x}_k$−xk $$P_k = E[(\hat{x}_k - x_k)(\hat{x}_k - x_k)^T] \tag{13}$$

in each time step [3], where $\hat{x}_k$ stands for then currently estimated state. [•]k=[•](kΔt) with the discrete sampling rate Δt applies in equation (13) and in the following. Since, however, the state space representation (9) represents a continuous system, the system described above is discretized in the following using the Euler-forward method [2].

The EKF performs a prediction step and a correction step in each time step for the state estimation. The state to the next time step is predicted on the basis of the system equations (9) within the prediction step:

$$\begin{aligned} \hat{x}_k^- &= \hat{x}_{k-1} + \Delta t f(\hat{x}_{k-1}, u_k), \\ \hat{y}_k^- &= h(\hat{x}_k^-, u_k). \end{aligned} \tag{14}$$

In addition to the system states, the error covariance matrix is also predicted within the prediction step $$P_k^- = A_k P_{k-1} A_k^T + Q_k, \tag{15}$$

where $P_{k-1}$ is the error covariance matrix to the time step (k−1)Δt, Ak is the transition matrix of the linearized system about the then current state and Qk is the time-discrete covariant matrix of the system noise. Ak is approximately calculated by the Taylor series of the matrix exponential function up to the first element.

$$A_k = I + \left.\frac{\partial f(x, u_k)}{\partial x}\right|_{x = \hat{x}_k^-}, \tag{16}$$

Figure 8:
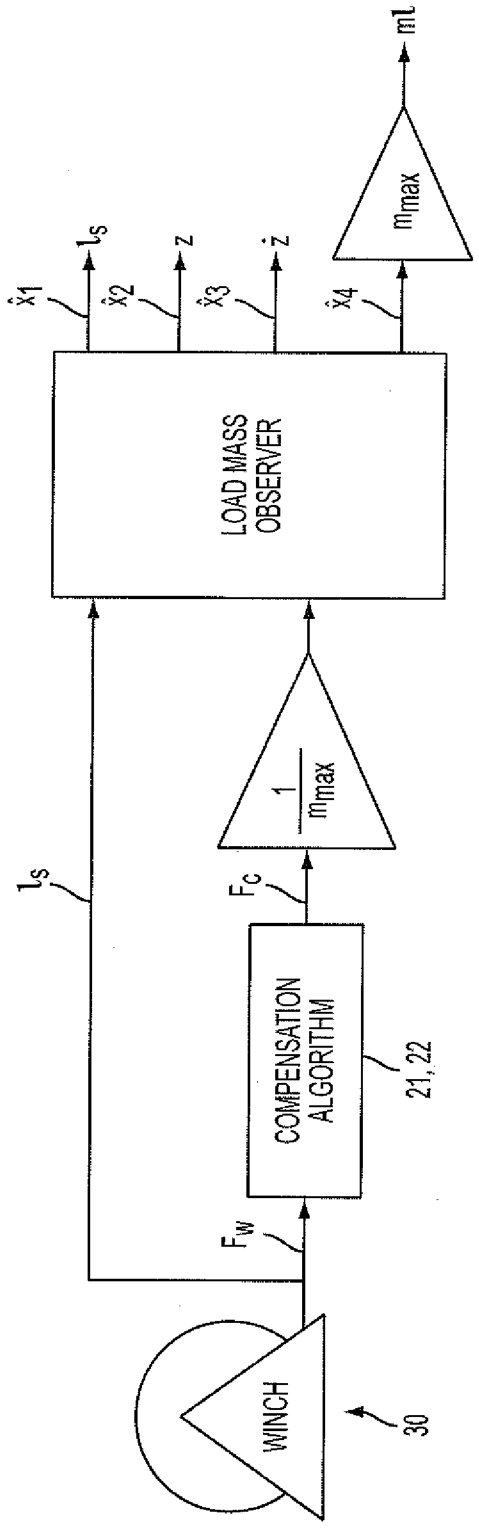
FIG. 8 shows a schematic representation of an embodiment of a cable mass observer in accordance with the present disclosure.

FIG. 8 again shows the embodiment of the load mass observer in a block diagram. In addition to the force FW measured at the winch, the length of the hoist cable lS is included as a measured signal in the load mass observer. The total force is in this respect, as represented in detail above, first compensated with respect to the cable weight and the friction effects and is normalized with the maximum permitted load mass mmax. The load mass observer then estimates the normalized load mass as ×4 which is accordingly again converted by multiplication by mmax into the load mass ml. In addition, the load mass observer also estimates the cable length ls, the position of the load z and the load speed ż which can likewise be used for control purposes.

The present disclosure enables an exact determination of the load mass in which both the effects of the arrangement of the measurement arrangement for measurement of the cable force via a connection element between the crane structure and the hoist cable such as at a torque support of the hoist winch or a deflection pulley and dynamic effects which arise due to the elasticity of the hoist cable are taken into account. The load mass can in this respect be used either for control work or for data evaluation. The load mass can in particular be stored for each lift in a memory unit, e.g. a database, and so evaluated.

Note that the example control and estimation algorithms included herein can be used with various crane system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may represent non-transitory code to be programmed into a computer readable storage medium in the crane control system.

The invention claimed is:

1. A crane control system for indirectly determining a load mass of a load carried by a hoist cable of a crane, comprising:

a measurement arrangement for measuring a cable force in the hoist cable to produce a signal indicating the cable force; and a calculation unit including non-transitory code stored in a non-transitory computer-readable storage medium for receiving the signal indicating the cable force and indirectly determining the load mass based on the indicated cable force, wherein the calculation unit has a compensation unit, which calculates an influence of the indirect determination of the load mass via the cable force in a physical model in the calculation unit and at least partly compensates this influence in calculating the load mass, wherein the compensation unit includes a cable mass compensation which compensates for a weight of the hoist cable during the calculation of the load mass and which compensates for a change of cable length when the load is raised and/or lowered, wherein the hoisting gear includes a winch and a winch signal indicating an angle of rotation and/or a speed of rotation of the winch is received by the compensation unit and is an input parameter in the cable mass compensation.

2. A crane control system in accordance with claim 1, wherein the compensation unit receives and operates based on data on a position and/or movement of the crane, including data on a position and/or movement of a hoisting gear, and/or data on a position and/or movement of a boom and/or of a tower of the crane.

3. A crane control system in accordance with claim 1, wherein the compensation unit includes a deflection pulley compensation which compensates for friction effects caused by deflection of the hoist cable about one or several deflection pulleys in calculating the load mass.

4. A crane control system in accordance with claim 1, wherein the compensation unit compensates for an effect of an acceleration of the load mass and/or of the hoisting gear on the cable force in calculating the load mass.

5. The crane control system of claim 1, wherein the influence is defined by geometrical relationships between structural elements of the crane and the measurement arrangement and/or by dynamic effects of movements of the load.

6. The crane control system of claim 1, wherein at least partly compensating the influence further comprises adjusting the load mass calculated from the cable force based on a mass of the hoist cable.

7. A crane control system in accordance with claim 2, wherein the crane comprises a hoisting gear for raising and lowering the load carried by the hoist cable of the crane, wherein the hoist cable is led from the measurement arrangement via at least one deflection pulley of the crane to the load, and/or wherein the measurement arrangement for measuring the cable force in the hoist cable is positioned at the deflection pulley or at the hoisting gear, wherein the compensation unit at least partly compensates an effect of the position of the measurement arrangement on the load mass.

8. The crane control system of claim 2, wherein the calculation unit receives a position signal indicating the position and/or movement of the crane, including the data on the position and/or movement of the hoisting gear, and/or the data on the position and/or movement of the boom and/or of the tower of the crane and wherein the influence of the indirect determination of the load mass is based upon the position and/or movement of the crane indicated by the position signal.

9. A crane control system in accordance with claim 3, wherein the deflection pulley compensation receives a rotation signal indicating parameters associated with a direction of rotation and/or a speed of rotation of the deflection pulleys and compensates for friction effects caused by deflection of the hoist cable about the one or several deflection pulleys using the direction of rotation and/or the speed of rotation of the one or several deflection pulleys as an input in calculating the load mass, wherein the deflection pulley compensation calculates a direction of rotation and/or a speed of rotation of the deflection pulleys caused by movement of the crane structure and/or movement of the hoisting gear.

10. A crane control system in accordance with claim 3, wherein the deflection pulley compensation calculates the friction effects in dependence on the measured cable force.

11. A crane control system in accordance with claim 4, wherein the calculation unit compensates for oscillation dynamics which arise due to elasticity of the hoist cable in calculating the load mass.

12. A crane control system in accordance with claim 7, wherein the cable mass compensation compensates for the weight of the hoist cable wound on the winch in calculating the load mass.

13. A crane control system in accordance with claim 7, wherein the cable mass compensation receives a hoist signal indicating a change in length and/or an alignment of parts of the hoist cable caused by movement of the crane structure and compensates for the change in length and/or the alignment of parts of the hoist cable in calculating the load mass.

14. The crane control system of claim 7, wherein at least partly compensating the influence further comprises adjusting the load mass calculated from the cable force based on a friction at the at least one deflection pulley.

15. A crane control system in accordance with claim 11, wherein the calculation unit includes a load mass observer which is based on a spring model of the cable and the load.

16. The crane control system of claim 14, wherein the friction is calculated by determining a direction of rotation of the at least one deflection pulley based on the position and/or movement of the hoisting gear and of the boom, and determining a friction at the at least one deflection pulley.

* * * * *